United States Patent [19]

Tajer-Ardebili

[11] Patent Number: 5,630,913
[45] Date of Patent: May 20, 1997

[54] WATER DISTILLATION SYSTEM

[76] Inventor: Davoud Tajer-Ardebili, 31 Grey Gum Road, Mount Colah, NSW, Australia, 2079

[21] Appl. No.: 374,577

[22] PCT Filed: Jul. 23, 1993

[86] PCT No.: PCT/AU93/00372

§ 371 Date: Mar. 14, 1995

§ 102(e) Date: Mar. 14, 1995

[87] PCT Pub. No.: WO94/02419

PCT Pub. Date: Feb. 3, 1994

[30] Foreign Application Priority Data

Jul. 24, 1992 [AU] Australia ................ PL3748

[51] Int. Cl.⁶ ................ B01D 3/10; C02F 1/04; C02F 1/20
[52] U.S. Cl. ................ 202/176; 159/901; 159/DIG. 16; 159/DIG. 30; 159/DIG. 40; 202/167; 202/182; 202/185.3; 202/197; 202/202; 202/205; 203/4; 203/11; 203/39; 203/91; 203/DIG. 4
[58] Field of Search ................ 203/1, 11, 4, 91, 203/39, DIG. 4, 10, 100; 202/176, 202, 205, 197, 167, 182, 185.3, 181; 159/DIG. 30, DIG. 40, DIG. 16, 901; 62/324.1; 96/155, 188

[56] References Cited

U.S. PATENT DOCUMENTS

| | | | |
|---|---|---|---|
| 3,558,436 | 1/1971 | Foley et al. | 202/196 |
| 4,525,243 | 6/1985 | Miller | 202/181 |
| 4,985,122 | 1/1991 | Spencer | 203/DIG. 4 |
| 5,227,027 | 7/1993 | Topper | 203/10 |
| 5,439,560 | 8/1995 | Karematsu et al. | 203/DIG. 4 |

FOREIGN PATENT DOCUMENTS

| | | | |
|---|---|---|---|
| 2546873 | 5/1983 | France | C02F 1/04 |
| 1285572 | 8/1972 | Germany | 203/DIG. 4 |
| 3404248A1 | 8/1985 | Germany | C02F 1/10 |
| 2128490 | 5/1984 | United Kingdom | B01D 3/12 |
| WO83/03821 | 11/1983 | WIPO | C02F 1/04 |
| WO89/03715 | 5/1989 | WIPO | B01D 3/10 |

OTHER PUBLICATIONS

Abstract, C-134, p. 49, JP, A, 57-130501, Aug. 13, 1982.
Abstract, C-134, p. 49, JP, A, 57-130502, Aug. 13, 1982.
Abstract, C-134, p. 49, JP, A, 57-130503, Aug. 13, 1982.
Abstract, C-320, p. 49, JP, A, 60-153986, Aug. 13, 1985.
Derwent Abstract, 27238B/14, Class D15, (Van Geest) Mar. 21, 1979.

*Primary Examiner*—Virginia Manoharan
*Attorney, Agent, or Firm*—Jacobson, Price, Holman & Stern, PLLC

[57] ABSTRACT

A water distillation system (10) includes a boiling chamber (11) and a condensation chamber (12). Water is fed via an inlet pipe (13) to a degassing chamber (15) where volatile gases are removed from the water. The water is evaporated in the boiling chamber (11) and vapour is, in turn, condensed in the condensing chamber (12). Distilled water is collected in a water storage tank (30) and is used, with a pump (28) and entrainment device (27), to provide a substantial vacuum within the system (10).

8 Claims, 4 Drawing Sheets

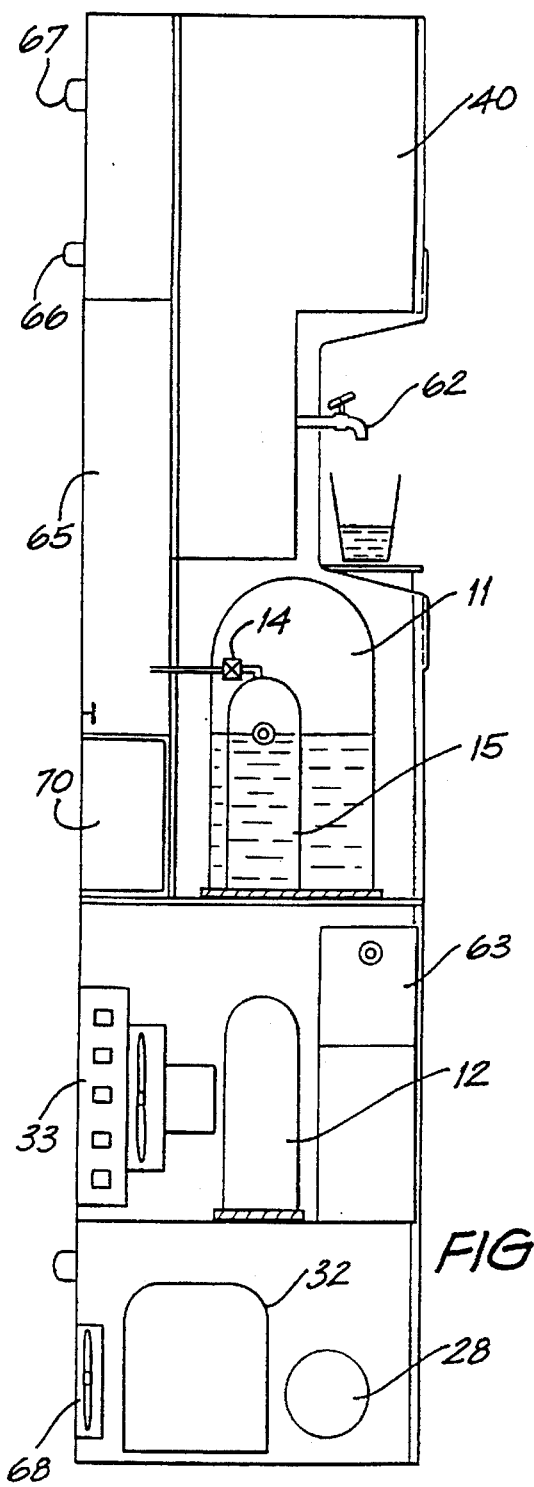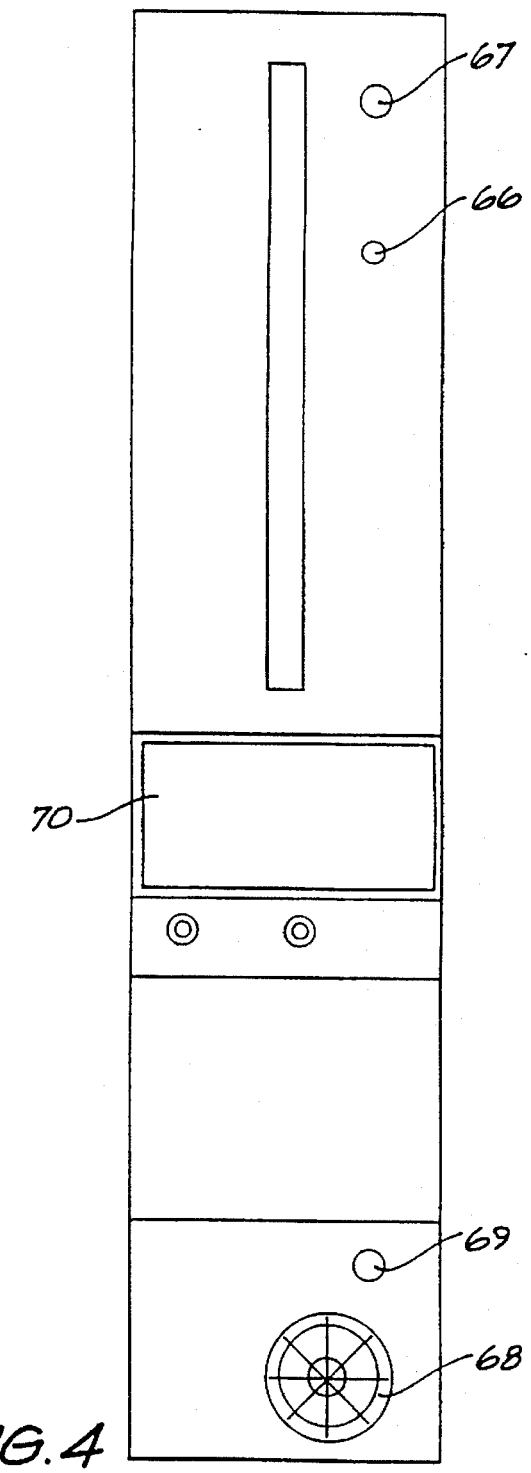

WATER DISTILLATION SYSTEM

The present invention relates to water purification systems and, in particular, to a water distillation system which is substantially more efficient than known systems.

BACKGROUND ART

There are a variety of methods of purifying water, one of these methods being distillation. One method of distilling water includes vaporising the liquid water under a vacuum and then condensing the water vapour, once again under vacuum so that the liquid water which has been condensed does not include any impurities.

OBJECT OF THE INVENTION

It is an object of the present invention to provide a water distillation system which is substantially inexpensive to install, and is relatively efficient.

DISCLOSURE OF THE INVENTION

According to one aspect of the present invention there is disclosed a water distillation system comprising:
a water evaporator, a water condenser and a water storage tank, which evaporator, condenser and tank are connected in series so that water passes from the evaporator to the tank via the condenser;
a water inlet to deliver feed water to the evaporator;
a water outlet from said tank;
means to reduce pressure in said evaporator and condenser relative to atmosphere;
a refrigerant condenser in said water evaporator;
a refrigerant evaporator in said water condenser; a throttle means through which refrigerant from said refrigerant condenser passes to said refrigerant evaporator;
are refrigerant compressor to pump refrigerant from said refrigerant condenser to said refrigerant evaporator; and
a heat exchanger in said water tank through which the refrigerant passes to cool water located in said tank, said heat exchanger being positioned operatively after said throttle means and before said compressor relative to the direction of flow of the refrigerant.

BRIEF DESCRIPTION OF THE DRAWINGS

Some embodiments of the present invention will now be described with reference to the drawings in which:

FIG. 3 is a left side view of the housing of FIG. 2, with side panels removed;

FIG. 4 is a rear view of the housing of FIG. 2; and

BEST MODE OF CARRYING OUT THE INVENTION

Figure 1:
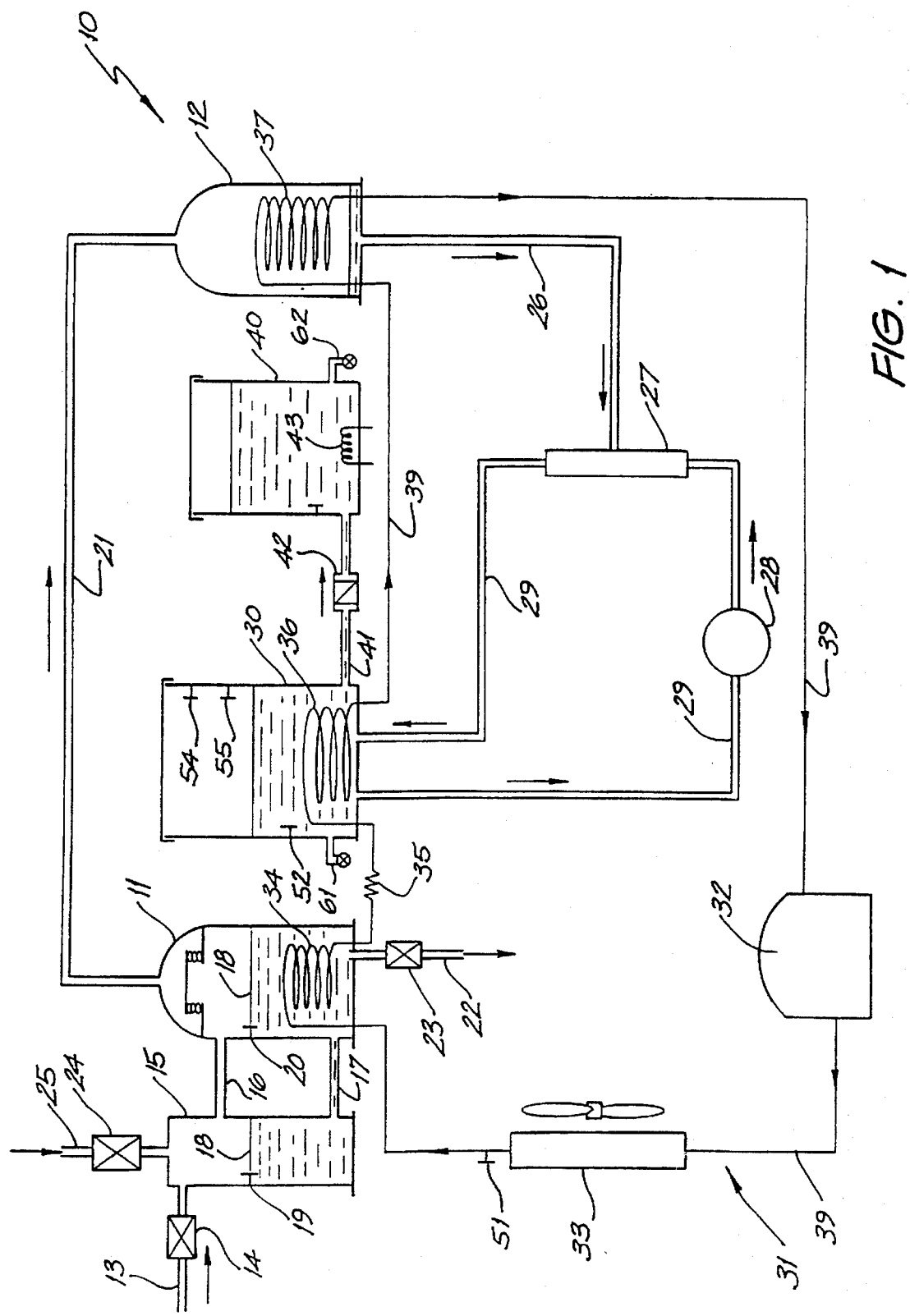
FIG. 1 is a schematic diagram of a water distillation system of a first embodiment.

A water distillation system 10 of a preferred embodiment includes a boiling chamber or evaporator 11 and a condensation chamber 12. Water is fed via an inlet pipe 13 having a solenoid valve 14 to a degassing chamber 15 where volatile gases are removed from the water. The degassing chamber 15 and the boiling chamber 11 have a pair of connecting pipes 16 and 17. As the boiling chamber 11 and degassing chamber 15 are positioned at the same level, the water level 18 within the chambers 11 and 15 is the same and controlled by level switches 19 and 20.

The boiling chamber 11 is connected by a vapour outlet pipe 21 to the condensation chamber 12. The boiling chamber 11 also has a concentrate outlet 22 which is opened and closed by a solenoid valve 23. Another solenoid valve 24 is attached to an air inlet 25 at the top of the degassing chamber 15. The bottom of the condensation chamber 12 has an outlet pipe 26 which is connected to an entrainment device 27 which entrains the condensate therein. A pump 28 connected into a pipe 29 is used to circulate water in the pipe 29 to a cold water storage tank 30. The circulated water in the pipe 29 and tank 30, with pump 28, are the sole means required to achieve a vacuum of up to approximately 96% in the outlet pipe 26 of the condensation chamber 12 which ensures that a vacuum is maintained throughout the system 10 in the degassing chamber 15, the boiling chamber 11, and the condensation chamber 12.

The energy required for the evaporation of water in the boiling chamber 11 is supplied by a refrigeration system 31. The refrigeration system 31 has a single refrigerant circuit and includes piping 39 which carries R22 gas. A compressor 32 is used to force the R22 gas through the refrigeration system 31. The system 31 further includes a desuperheater 33 a condensing coil 34 located below water level 18 in the boiling chamber 11, a capillary restrictor 35, or other suitable throttle means, a cooling coil 36 located in the cold water tank 30 and an evaporator coil 37 located within the condensation chamber 12.

The system 10 also includes as a preferred feature a hot water tank 40 which is connected to the cold water storage tank 30 via a pipe 41 having a non-return valve 42. The hot water tank 40 includes an electric heating element 43 to heat the water located therein.

The operation of the system 10 requires a vacuum of up to 96% being achieved by circulating the water at a temperature of 4° C.–7° C. from the cold storage tank 30 through pipe 29 and the entrainment device 27 by the pump 28. The water in the cold water storage tank 30 is cooled by the refrigeration system 31.

The refrigeration system 31 is also used to evaporate the water in the boiling chamber 11 when it is passed through the condensing coil 34. The hot R22 gases from the compressor 32 are first cooled to the required temperature for evaporation by the desuperheater air cooler 33. The temperature of the water within the boiling chamber is controlled by a thermostat 51 which controls the temperature of the R22 to be in the range 35° C.–55° C. The heat of the condensation of the R22 gas in the condensing coil 34 provides the energy required for evaporation of the water in the boiling chamber 11. The boiling temperature of the water is substantially lower than the atmospheric boiling temperature of water due to the substantial vacuum in the system 10.

The water vapour passes through the vapour outlet pipe 21 and is received within the condensation chamber 12. The water in the cold storage tank 30 is maintained in the temperature range of 4° C.–7° C. by passing the R22 gases through the cooling coils 36 in the cold water tank 30. A thermostat 52 controls the temperature of the water within the tank 30. The evaporater coil 37 within the condensation chamber 22 is used to condense the water vapour which in turn goes from the condensation chamber 12 to the entrainment device 27.

For the water distillation, the feed water is fed to the degassing chamber 15 via the solenoid valve 14. Volatile gases are removed from the feed water at this stage. A level switch 53 controls the level of the water in the degassing chamber 15 and the boiling chamber 11.

Figure 2:
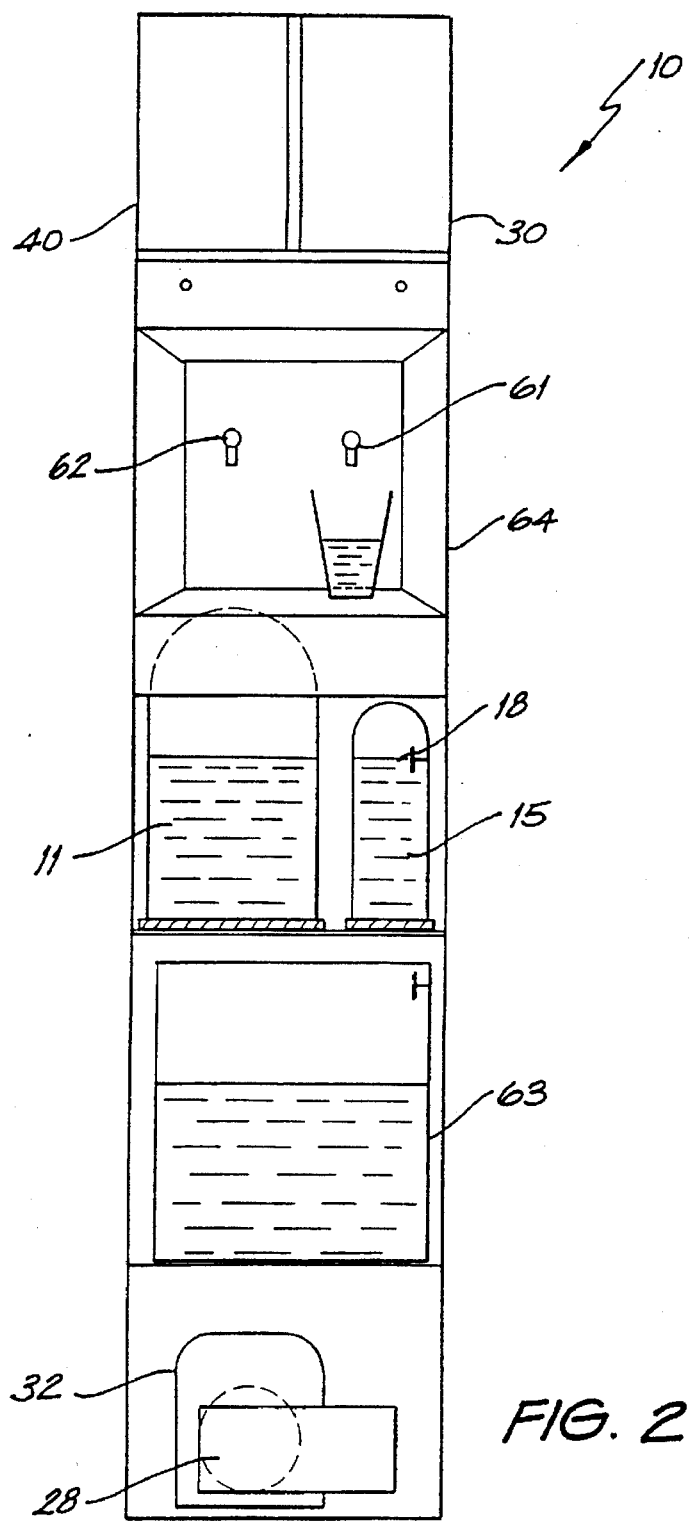
FIG. 2 is a cutaway front view of the water distillation system of FIG. 1 illustrating the layout of the system in a housing.

The degassed water is then fed by gravity to the boiling chamber 11 where it is heated to the desired boiling temperature and the resulting water vapour is fed to the condensing chamber 12 via the vapour outlet pipe 21. The water vapour which is condensed by the evaporater coil 37 within the condensation chamber 12 is removed by the entrainment device 27 and is pumped by the pump 28 to the cold water storage tank 30. Depending on the quality of the feed water, when the concentration of the contaminants in the boiling chamber 11 reaches a certain predetermined level, solenoid valves 23 and 24 are automatically operated to let the concentrate flow out by gravity to a blown down tank 63 (FIGS. 2–4).

Level switches 54 and 55 within the cold water storage tank 30 are used to control the level of the water in this tank. When the level of the water in the tank reaches the level switch 54, the pump 28 stops operating until the level of the water drops below level switch 55. When the tank 30 is full and the pump 28 has stopped, pure water will still be produced and stored in the condensation chamber 12. This is due to the fact that the vacuum once establishes nearly self-generated by the condensation of the water vapour. The production of pure water will continue until the evaporator coils 37 are completely submerged in the water.

During the period that the pump 28 has stopped, the thermostat 51 controls the operation of the compressor 32 to keep the water temperature in the tank 30 at a predetermined value.

During this cycle the purified water in the cold water tank is able to be removed as required from an outlet 61 and is also able to be fed through the non-return valve 42 to the hot water tank 40 where the water is heated by the heating element 43 which is controlled by a thermostat 44. Hot water is available through outlet 62. Therefore hot and cold water is possible in the water distillation system 10.

Illustrated in FIGS. 2–4 the system 10 is located within a housing 64. The water inlet 13 is supplied from a supply storage tank 65 which has an inlet 66 and an overflow outlet 67. All the components are located in the housing 64 which has a cooling fan 68 and a blowdown outlet 69. A control unit 70 houses the power and control circuit which are used to control and operate the system 10.

Figure 5:
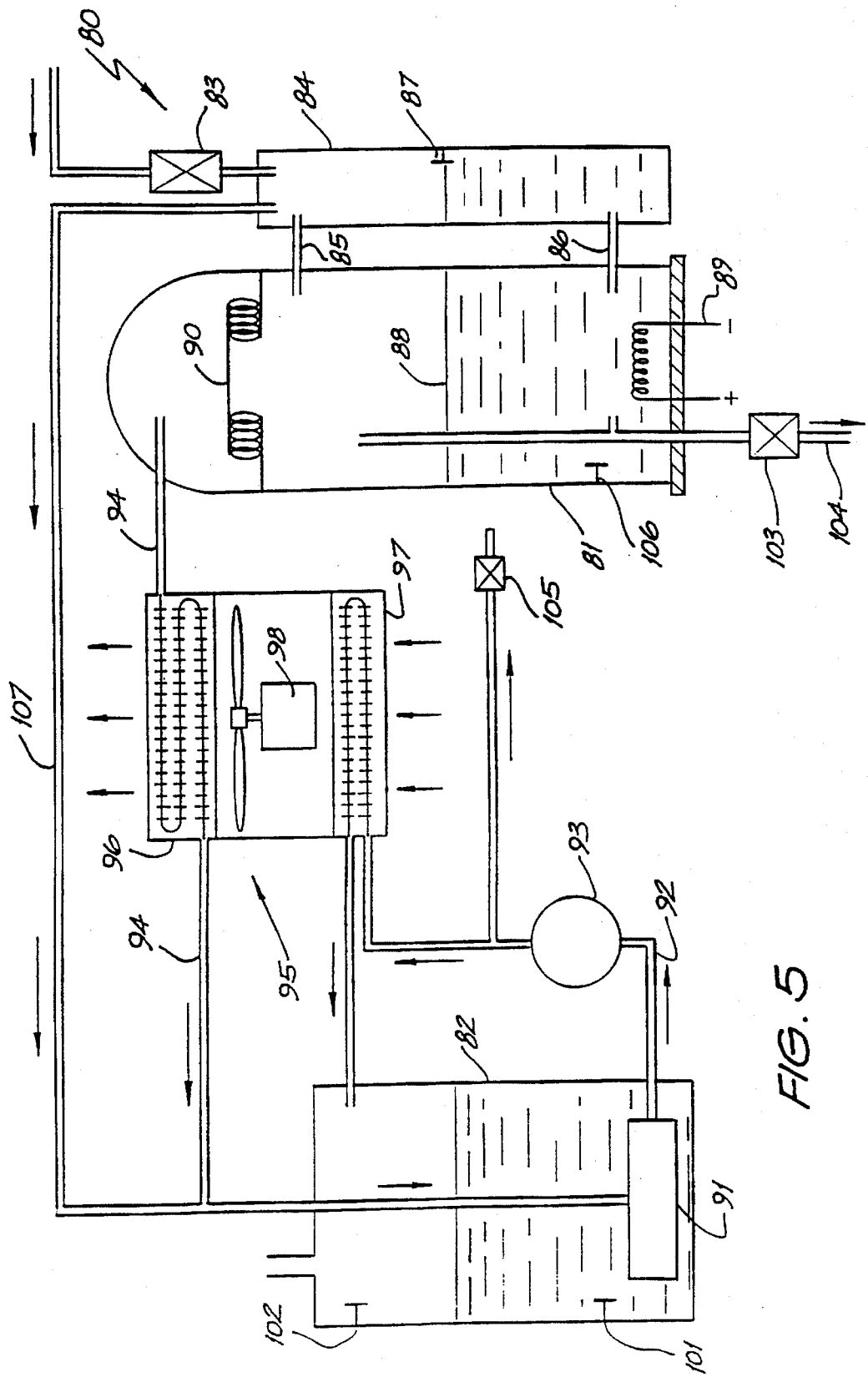
FIG. 5 is a schematic diagram of a water distillation system of a second embodiment.

The water distillation system 80 of a second embodiment as illustrated in FIG. 5 includes a boiling chamber 81 and a storage tank 82. Tap water is fed to the boiling chamber 81 via a solenoid valve 83 and a degassing chamber 84 where dissolved gases are flashed out of the water which is fed, in turn, to the boiling chamber 81. The degassing chamber 84 also acts as a level controller of the boiling chamber 81, as these two chambers 81 and 84 are on the same level and therefore the level of the water within the two chambers 81 and 84 is identical as two pipe 85 and 86 join the two chambers 81 and 84. A level switch 87 is used to control the solenoid valve 83 and hence the introduction of water into the degassing chamber 84 and hence the water level 88 in the boiling chamber 81.

The boiling chamber 81 which is therefore partially filled with water, has an electric heating element 89 which heats the liquid water. A level switch 106 is used to ensure water level does not go lower than a certain level. An entrainment separator 90 above the water level 88 is used to entrain the water vapour as the water evaporates.

The storage tank 82 includes an entrainment device 91 which is connected by piping 92 to a pump 93. The other side of the entrainment device 91 is connected to pipes 94 which connect to the boiling chamber 81. Mother pipe 107 is connected in parallel to the degassing chamber 84 to equalise pressure within the system 80. The pump 93 in conjunction with the entrainment device 91 pipes 94 and 107 located between the storage tank 82 and boiling chamber 91 and the degassing chamber 84, as well as the boiling chamber 91 and the degassing chamber 84.

An air condenser 95 preferably made of stainless steel, has an upper section 96 and a lower section 97 which is used to condense the water vapour in the pipes 94 as well as dissipating heat generated by the pump 8. A fan 98 is used to blow air over coils 94 and 100 respectively to effect the condensation and cooling.

In operation, tap water is fed through the solenoid valve 83 to the degassing chamber 84 where dissolved gases are flashed out before water is fed, in turn, to the boiling chamber 81. The vacuum generated by the entrainment device 91 and pump 93 (a vacuum of approximately 92%) in the boiling chamber allows the liquid water to boil in the temperature range 40° C.–45° C. The water vapour passes through the entrainment separator 90 before being fed to the condenser 95 through the pipe 94. The water vapour is condensed and cooled within the air condenser 7 and the pure liquid water is which is produced is then sucked by the pump into the entrainment device 91. The pipe 107 is used to equalise pressure. The water is then cooled by the lower section 97 of the air condenser 95 and returned to the storage tank 82 where it is able to be entrained by the entrainment device 91. The storage tank 82 has two level switches 101 and 102 and when the level in the storage tank 82 reaches the level switch 102, the system 80 is turned off and a solenoid valve 103 in the boiling chamber 81 opens to let the concentrate in this chamber 81 to be removed via a blow-down outlet 104.

The distilled water in the storage tank 82 is then used as required. The water is removed by the pump out solenoid valve 105. When the level in the storage tank reaches the level switch 101, the system recommences to produce enough distilled water as required.

The system can be used continuously to provide distilled water or can be used in discrete amounts.

The system 10 of the first embodiment is useful in that any volatile gases in the feed water are separated under vacuum, in the degassing chamber 15, remain separated until the exit of entrainment device 27. This is due to the fact that because the volatile gases are under a high vacuum, they have no affinity to be dissolved back into the distillate in the pipe 29, even though the volatile gases and distillate are in contact, at nearly atmospheric pressure for a short period of time, ie approximately less than one second, only a minute amount of volatile gases can dissolve back into the water. In addition, chlorine which is dissolved in the feed water, when separated in the degassing chamber 15 acts as an antiseptic agent to cleanse the system 10.

The system 10 is relatively energy efficient, during the production cycle, as the compressor 32 is used to evaporate the feed water in the boiling chamber 11, condense the vapour in the condensation chamber 12 and maintain the water in the cold water storage tank 30 at a temperature in the range 4° C.–7° C.

During the cooling cycle, ie when the cold water storage tank 30 and the hot water tank 40 are full, and the pump 28 has been switched off, the distillate (water) is stored in the condensation chamber 12 and the system 10 self adjusts the production rate with the available surface of the coil 37 and the level of the vacuum. Once the condensation chamber 12 is full of water, the desuperheater 33 acts as a condenser while the cold water storage tank cooling coil 36 acts as an evaporator.

The arrangement of the system 10 allows the pump 28 and entrainment device 27 to operate at 4° C. and produce a very high vacuum of up to 98%, and the pump 28 has the additional feature of transferring the distilled water to the storage tanks 30 and 40.

Boiling the water in the temperature range 35° C.–55° C. ensures that the vapour thus formed will not carry bacteria, mineral contaminants, dissolved solids including radioactive contaminants, through to the condensing system of both embodiments.

Typical water quality resulting from city water feeds is approximately 1 ppm of dissolved solids.

The foregoing describes only one embodiment of the present invention and modifications obvious to those skilled in the art, can be made thereto without departing from the scope of the present invention.

For example, the evaporation and condensation of the feed water and water vapour, respectively, can be achieved by other means of heat exchange such as heating elements or cooling elements.

I claim:

1. A water distillation system comprising:

a water evaporator, a water condenser and a water storage tank, the evaporator, condenser and tank being connected in series so that water passes from the evaporator to the tank via the condenser;

a water inlet to deliver feed water to the evaporator;

a water outlet from said tank;

degassing means interposed between said water inlet and said evaporator for removing dissolved gasses in said feed water and for maintaining a predetermined level of said feed water in said evaporator;

means for reducing pressure in said evaporator and condenser relative to atmospheric pressure, wherein said means for reducing pressure includes an entrainment device and a circulation pump to pump water from said water storage tank around a circulation pipe, and wherein said pump receives water from said water storage tank and outputs water to a through input of said entrainment device, a through output of said entrainment device returning water to said water storage tank, said entrainment device further including a transverse port interconnected to an outlet of said condenser to entrain, under vacuum, condensate from said condenser to water passing to said water storage tank; and a single refrigerant circuit, said refrigerant circuit including:

a refrigerant condenser in said water evaporator;

a refrigerant evaporator in said water condenser;

a throttle device through which refrigerant from said refrigerant condenser passes to said refrigerant evaporator;

a refrigerant compressor to circulate said refrigerant around said circuit;

desuperheater means, through which the refrigerant passes, to cool the refrigerant, said desuperheater means being positioned operatively after said compressor and before said refrigerant condenser; and a heat exchanger, through which the refrigerant passes, located in said water storage tank to cool water located in said tank, said heat exchanger being positioned in said circuit after said throttle means and before said compressor relative to the direction of flow of the refrigerant about said circuit.

2. The water distillation system as claimed in claim 1, wherein the water inlet has a control valve means to regulate feed water entering through said inlet.

3. The water distillation system as claimed in claim 2, wherein said evaporator has an outlet control valve which is able to be operated to remove the water and any contaminants therein from said evaporator.

4. The water distillation system as claimed in claim 3, wherein said system includes a hot water storage tank which receives water from said water storage tank, said hot water storage tank having a heater element.

5. The water distillation system as claimed in claim 4, wherein a non-return valve is positioned between said storage tank and said hot water storage tank.

6. The water distillation system as claimed in claim 1 wherein said evaporator is maintained within the temperature range 35° C.–55° C. during operation of said system.

7. The water distillation system as claimed in claim 1, wherein said water in said storage tank is maintained within the temperature range 4° C.–7° C. during operation of said system.

8. The water distillation system as claimed in claim 1 wherein said means for reducing pressure is a sole means for reducing pressure.

* * * * *